JOSEPH M. SCHMIED
INVENTOR

Aug. 20, 1940.     J. M. SCHMIED     2,211,864
PUNCH PRESS WITH BALANCED RAMS
Filed Aug. 7, 1937     6 Sheets-Sheet 6
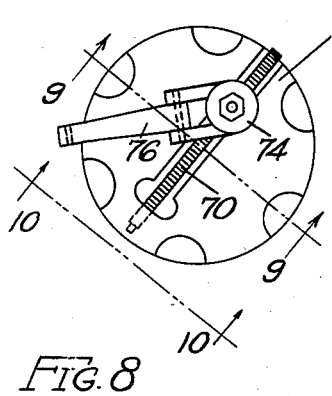
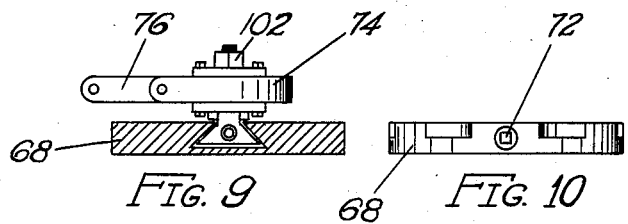
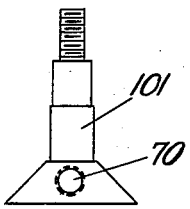
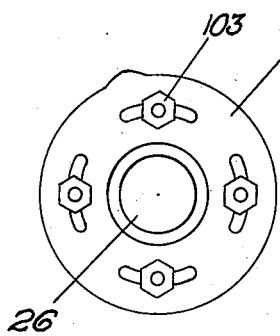
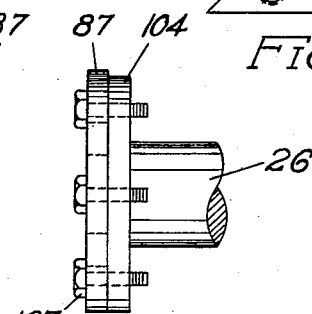
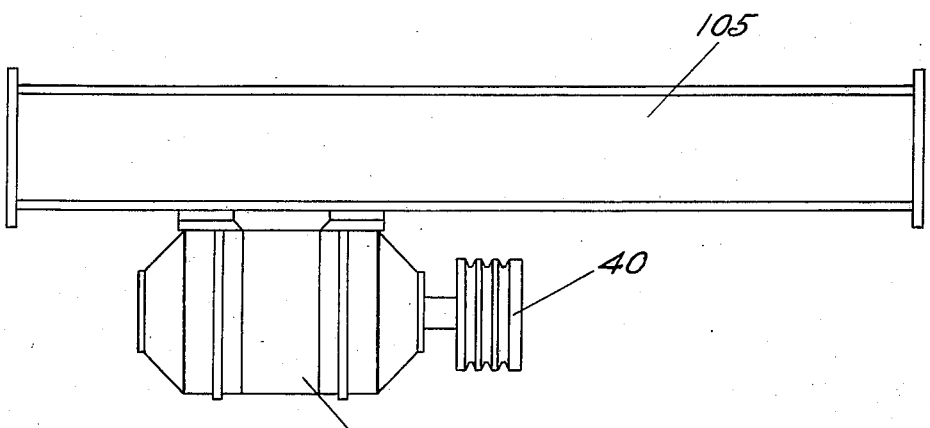
JOSEPH M. SCHMIEL
INVENTOR
PER
ATTORNEY Patented Aug. 20, 1940

2,211,864

UNITED STATES PATENT OFFICE 2,211,864

PUNCH PRESS WITH BALANCED RAMS

Joseph M. Schmied, Chicago, Ill., assignor to Victor Manufacturing & Gasket Company, Chicago, Ill., a corporation of Illinois Application August 7, 1937, Serial No. 157,894

10 Claims. (Cl. 164—49)

This invention relates to an improved punch press with balancing rams, and has, for one of its principal objects, the provision of a punch press or the like for heavy duty which shall comprise essentially two rams or operative elements working toward each other for the punching or similar operation and which are positioned in the device in such a manner as to take advantage of balanced forces acting in opposite directions.

One of the important objects of this invention is to provide a punch press, particularly of the heavy duty type, which will include novel principles of construction and operation whereby better and more efficient results are attained with a minimum expenditure of power and with minimum vibration.

Another important object of this invention is to provide, in a punch press or the like, a closely controlled series of operating steps whereby a very considerable amount of accuracy in the finished product is accomplished regardless of the size or dimensions of the apparatus itself or particular product resulting from the operations.

Another and still further important object of the invention is to provide a practically automatically operating punch press apparatus which, after being once started, will continue to function with little or no attention and which, furthermore, will practically automatically control the movement of materials therethrough and the operations upon said materials.

Other and further important objects of the invention will be apparent from the disclosures in the accompanying drawings and following specification.

The invention, in a preferred form, is shown in the drawings and hereinafter more fully described.

In the drawings:

Figure 6 is a partial sectional view taken on the line 6—6 of Figure 2, looking in the direction indicated by the arrows.

Figure 7 is a sectional view taken on the line 7—7 of Figure 4.

Figure 8 is a detail view of the adjustable driving means for the clutch operating elements shown in Figure 3.

Figure 9 is a sectional view taken on the line 9—9 of Figure 8, looking in the direction indicated.

Figure 10 is an end view of the element of Figure 9 taken from the position indicated by the line 10—10.

Figure 11 is a detail view of the adjustable support for the connecting link of Figure 9.

Figure 12 is a detail view of the feed roller lifting cam shown in Figure 4.

Figure 13 is a side view of the cam of Figure 12.

Figure 14 is a detail view, showing the driving motor for the mechanism together with its support.

As shown in the drawings:

Figure 1:
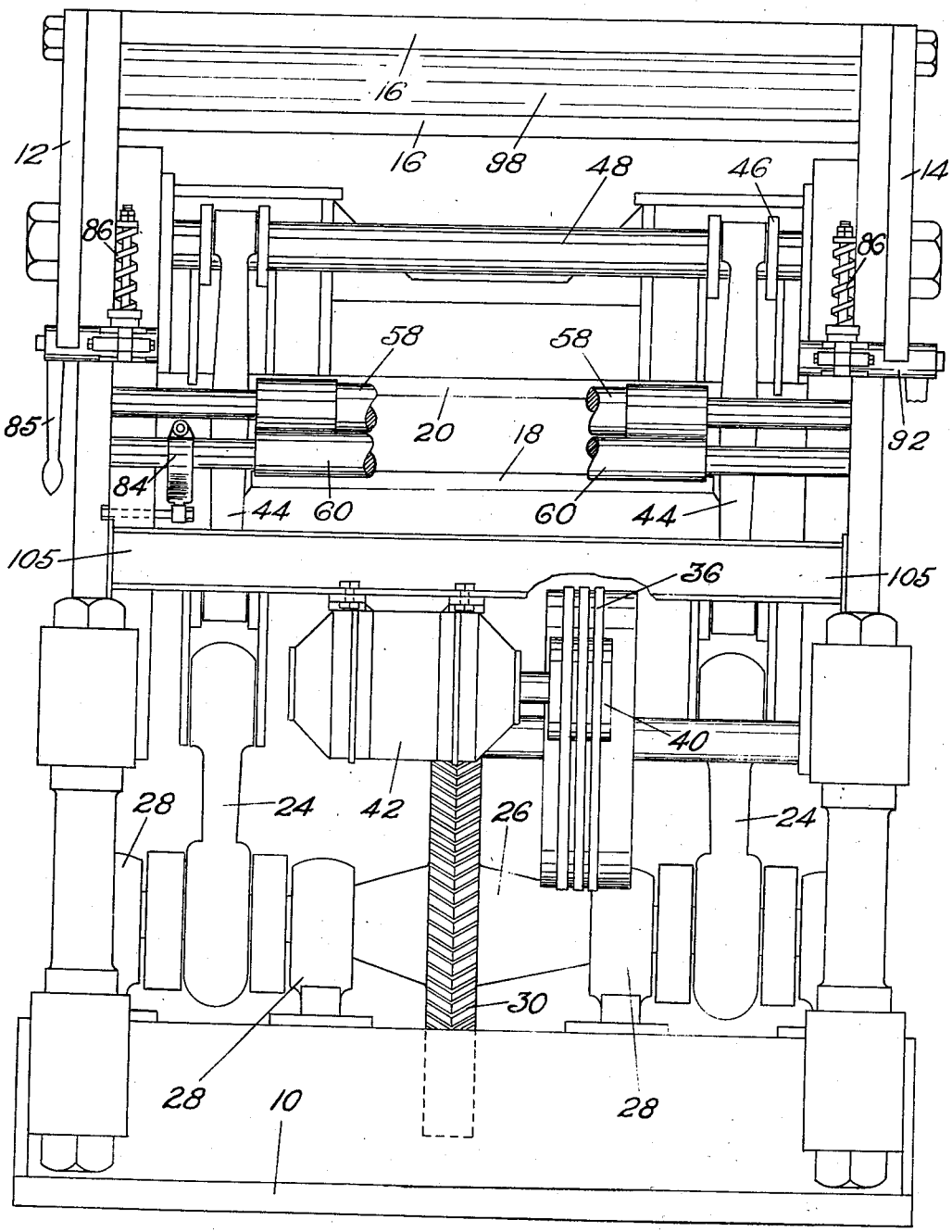
Figure 1 is a front elevation of the improved punch press with balanced rams of this invention, certain parts being broken away or omitted to show other constructions more clearly.

The reference numeral 10 indicates generally the foundation or base plate of the improved punch press with balanced rams of this invention, the same having side walls 12 and 14 respectively held together by tie-beams or the like 16 at the top thereof.

Figure 2:
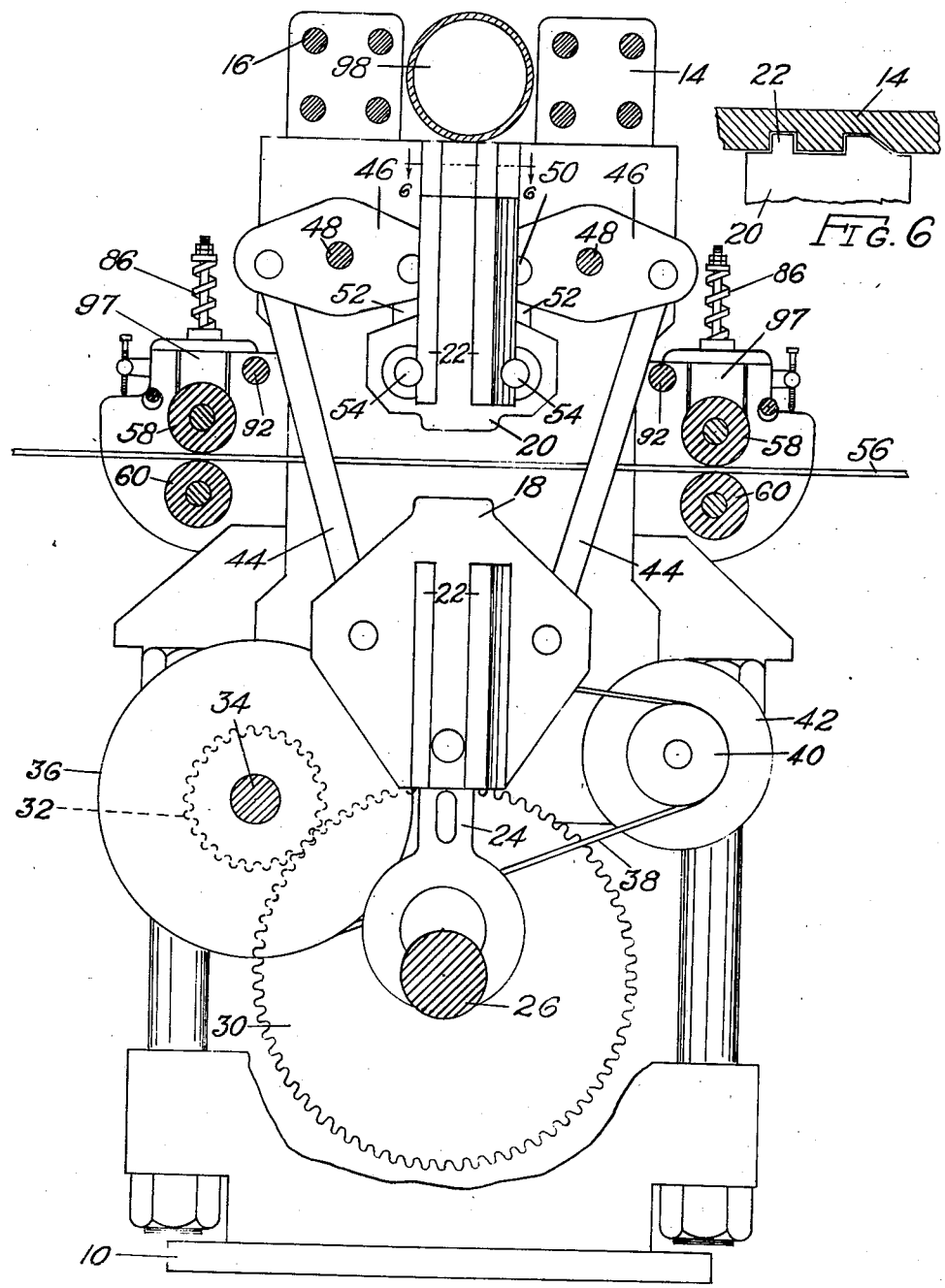
Figure 2 is an end view of the punch press taken from the left-hand side of Figure 1 and with the left side wall removed to show interior construction.

Slidably mounted in suitable grooves in the side walls 12 and 14 are lower and upper ram elements 18 and 20 respectively as best shown in Figure 2. These ram elements are each provided with extensions 22 which operate in the grooves in the side plates, thereby keeping the rams in proper alignment with each other and in the machine itself.

Figure 5:
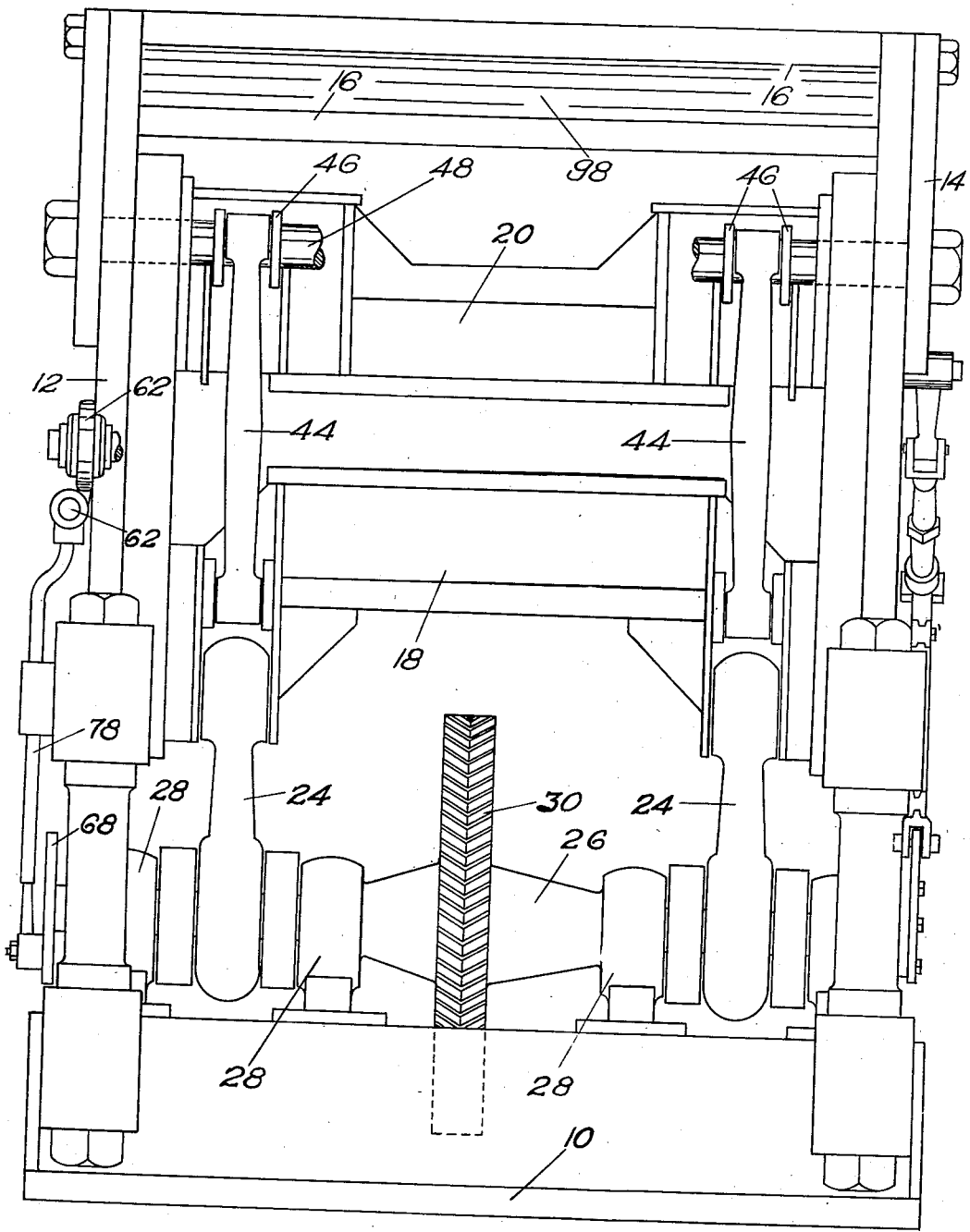
Figure 5 is a front elevation similar to Figure 1, but showing essential parts of the rams and connections which are more or less concealed or omitted in Figure 1.

The lower ram element 18 has a pair of connecting rods 24 mounted thereon, (Figures 1 and 5), the connecting rods, in turn, being mounted on a crank-shaft 26 positioned in suitable bearings 28 in the machine, and this crank-shaft is operated by a gear 30 which, in turn, is driven by a pinion 32 (Figure 2) mounted on a shaft 34 upon which shaft is positioned a driving or pulley wheel 36 driven by a belt 38 from a corresponding pulley wheel 40 operated by a motor 42. The motor is supported by a beam 105.

Mounted on suitable bearings in the lower ram 18 are two sets of pairs of links 44 which have their upper ends mounted at suitable bearings in the outer ends of rocker arms 46 (Figure 2), these rocker arms being pivoted on supporting shafts 48 and having oppositely disposed bearings 50 upon which are mounted links or the like 52 which have their lower ends fastened in bearings 54 in the upper ram 20.

From an inspection of Figure 2, it will be noted that the rams 18 and 20 are shown as spaced apart and that the sheet of metal or other material 56 to be operated upon is positioned at a point equidistant between the two rams. It is, however, explained that no dies are shown in this figure, but one form may be for perforating operations upon metal sheets or other material passing through the machine, and the particular position shown is that wherein the lower ram 18 is at the uppermost end of its stroke, and the upper ram 20 is at the lowermost end of its corresponding stroke. In this manner, the upward motion and momentum of the lower ram 18 is balanced by the downward motion and momentum of the upper ram 20 and vice versa whereby a smooth acting machine results and one which is subject to a minimum amount of vibration and which, furthermore, can be operated so as to produce a maximum efficiency with a minimum expenditure of energy.

Feed rollers for moving the material 56 through the machine are provided, these feed rollers being shown partly broken away at 58 and 60 respectively in Figure 1 and also indicated by the corresponding reference numerals in Figure 2, there being two sets of these rollers, one for forcing the material into the machine and the other for carrying the completed material out of the same.

In order that the material 56 be properly fed through the machine in a step-by-step relationship, driving means are provided for the feed rollers, these driving means comprising essentially a pair of one-way clutch elements as indicated at 62 (Figures 3 and 5), the detailed construction of which is disclosed in a companion application for patent of this same inventor. Suffice it to say that these one-way clutches are adapted to feed the material 56 through the machine in regulated steps of accurately controlled length, and that the clutches are simultaneously operated by means of a cross-bar 64 as best shown in Figure 3, this cross-bar, in turn, having a suitable adjusting locking nut 66 provided thereon.

Figure 3:
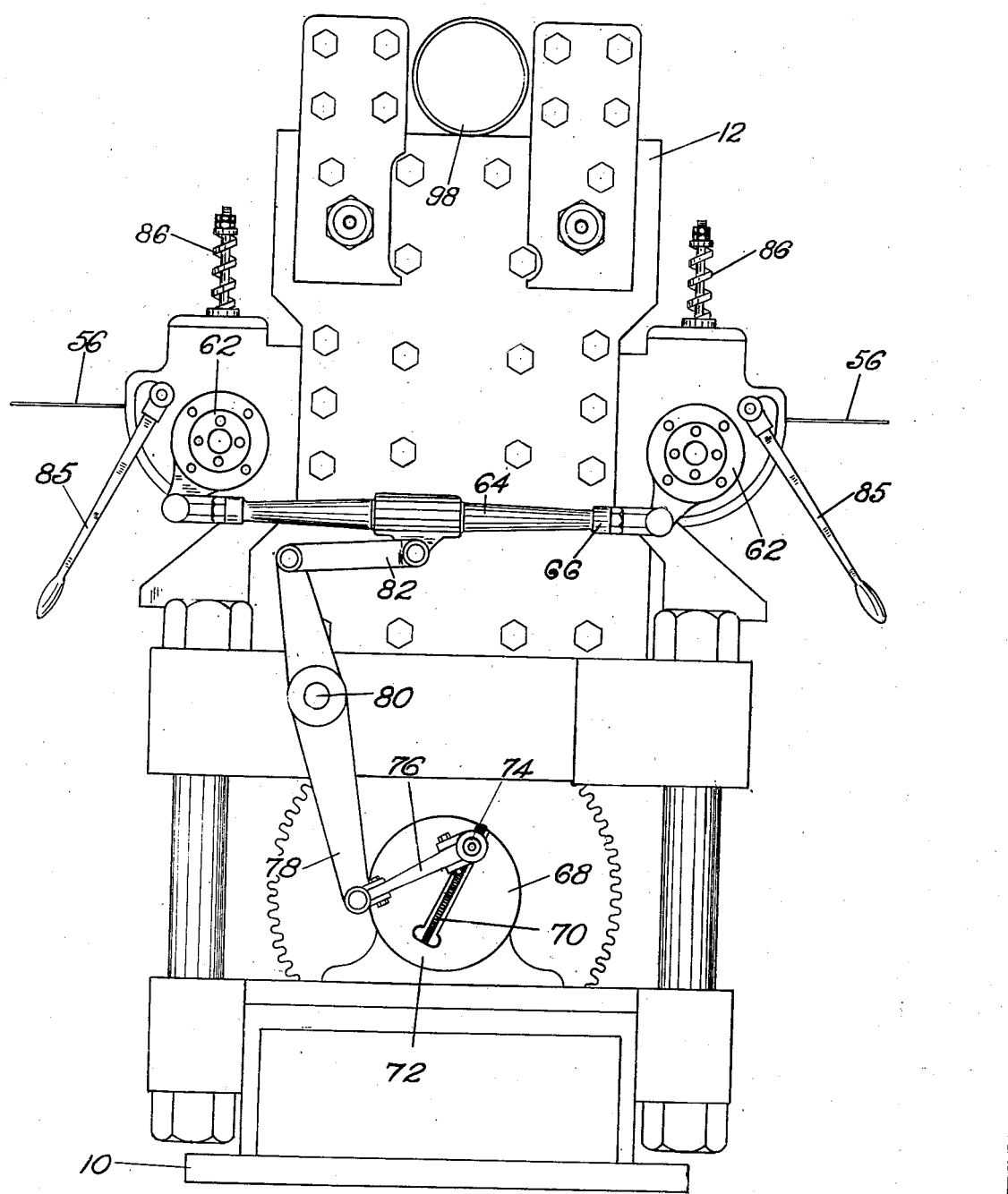
Figure 3 is a view from the left-hand end of Figure 1, showing the side wall and particular portions of the apparatus positioned on the outside face thereof.
Figure 4:
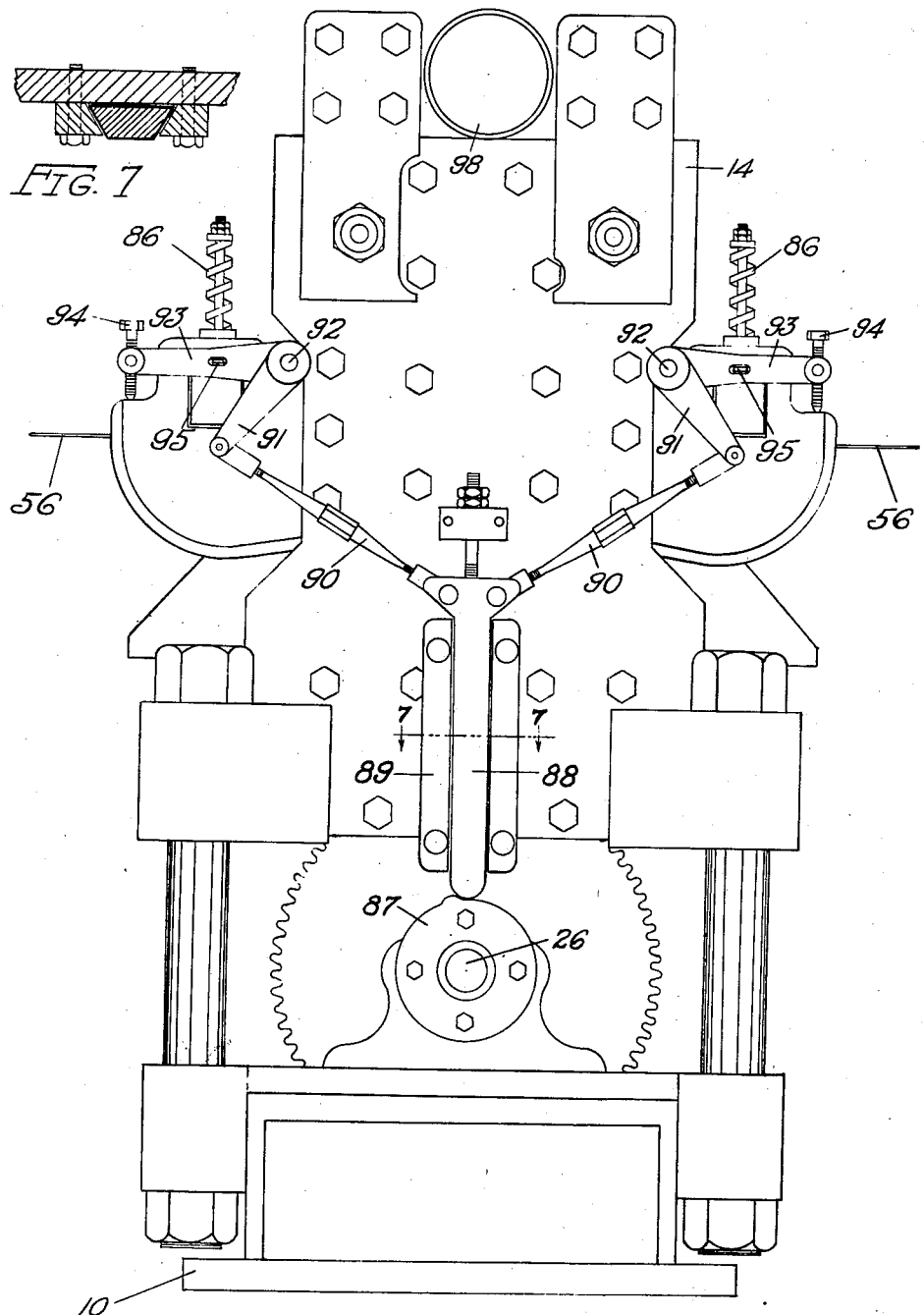
Figure 4 is a view from the right-hand end of Figure 1, showing a corresponding side wall and certain portions of the apparatus positioned on its outer face.

A disk 68 is mounted on the outer end of the crankshaft 26, and as best shown in Figures 3 and 8, has an opening passing diametrically therethrough, in which opening is positioned a screw-threaded rod 70, the rod having a squared head 72 by means of which it may be turned, and adjacent the other end of the rod, there is mounted a connection 74 which includes a link 76 and which, in turn, is connected to the lower end of a lever 78 pivoted at 80 on the side wall 12.

As best shown in Figures 8 to 11 inclusive, the screw-threaded rod 70 passes through a wedge-shaped end of a fitting 101, which wedge-shaped end is mounted in a correspondingly shaped groove in the disk 68. The shaft of the element 101 passes through the connection 74, and a nut 102 is provided whereby the wedge-shaped end of the element 101 can be locked in the groove in the disk 68, after the screw-threaded rod 72 has been adjusted so as to provide an accurate determination of the arc of rotation of the element 74 when the disk 68 turns with the crankshaft 26.

A link 82 connects the upper end of the lever 78 to the operating cross-bar 64 which controls the movement of the one-way clutch element 62. In this manner, the actual step-by-step forward feed of the material 56 into the machine can be accurately controlled and positively operated while, at the same time, there is no motion whatever of the material during the period over which the dies, of whatever type they may be, are operating upon the material due to the opposed reciprocating action of the rams 18 and 20. The action of the one-way clutches and connections is so regulated that the rearward movement of the bar 64 takes place while the material 56 is being operated upon by the dies or the like mounted on the rams 18 and 20.

A brake 84 (Figure 1) is provided on the shafts for the feed rollers 60 whereby a positive stoppage of the feed of the material 56 through the machine is assured following the operation of the one-way clutch elements 62.

Hand levers 85 are provided whereby the feed rollers may be separated against the tension of the springs 86 whenever it is desired to free the material 56 from the clinching engagement of the rollers 58 and 60 therewith for purposes of adjustment or the like.

It happens during the operation of machines of this type that the material 56 will eventually inevitably divert slightly to one side or another of its desired path, and for this purpose, joggers or pilots (not shown) are provided which may be of any desired type or which may simply constitute guides, but, in any event, it becomes necessary to intermittently release the grasp of the feed rollers from the material 56 so that these joggers, pilots or guides may act properly without distorting or buckling the material passing through the machine. This intermittent and practically instantaneous separation of the feed rollers 58 and 60 is accompanied at predetermined intervals during the operation of the machine by providing a cammed disk at 87 at the right-hand of the shaft 26, this disk, in turn, operating upon an element 88 slidably mounted in suitable supports 89 on the outer face of the plate 14, and at the upper end of this element 88, there is pivotally supported a pair of links 90 of adjustable length, the free ends of the links being, in turn, pivoted to the outer ends of the arms 91 of bell-crank levers fixed on shafts 92 rotatably positioned in the plates 12 and 14 and extending across the machine. The operative relation of the disk 87 can be adjusted by means of the bolts 103 which fasten this disk to the face of a plate 104 which, in turn, is fixed on the end of the shaft 26 as best shown in Figures 12 and 13.

Also fixed on these shafts are the other arms 93 of the bell-crank levers (Figure 5), the action of these arms being controlled by means of set screws 94, and each arm has a rectangular slot 95 therein in which is positioned the flattened end of a shaft 96 which, in turn, supports a block 97 which operates against the upper feed roller 58.

In this manner, the feed rollers are momentarily separated, once for each revolution of the crankshaft 26, this momentary separation preferably corresponding to the time at which the dies positioned on the rams 18 and 20 are actually performing their desired operation upon the material 56, thereby leaving this material free for proper action thereon by the dies, and, at the same time, positively preventing any possibility of any forward or sidewise movement of the material.

At 98 is illustrated a tank or container for lubricant which is forced under pressure to the various bearings and other parts of the apparatus, the lubricating system itself not being necessarily included as an integral portion of the actual operation of the machine or the particular invention here described.

It will be obvious that herein is provided a heavy duty punch press or the like which, on account of its well balanced forces, will operate with a minimum of wear and vibration, and which furthermore, on account of the accuracy of control, will produce a practically perfect finished product in a minimum time and with a minimum expenditure of effort, thereby eliminating a great deal of expensive labor and time charges which would otherwise be necessary for the turning out in quantities of precisely measured and accurately controlled machine operations.

One of the products which can be satisfactorily delivered from a machine of this type is a sheet or sheets of perforated metal, the perforations being quite close together and of relatively small size, this perforated metal being particularly useful in the production of reinforcing layers for gaskets, especially gaskets used in internal combustion engines and appurtenances. In these metallic reinforcing layers, it is necessary that sheets of asbestos or similar packing material be applied to the metal in such a manner as to be properly clinched thereinto, and it is, therefore, essential that the tangs or struck-up prongs, which are formed when the metal sheet is perforated, be of certain shape, size and contour within quite narrow limits, and it is further necessary that a great number of these perforations be made in a sheet of metal at one time and in very rapid successive so that production in quantities will be assured. The machine of this invention will satisfactorily produce a perforated metal sheet of this type, all that is necessary being the use of proper and corresponding dies for producing the perforations, these dies being more fully described in my co-pending application for patent entitled "Perforating devices and products" filed March 1, 1937, Serial No. 128,449.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A punch press, comprising a framework and a pair of rams slidably mounted therein for movement toward and from each other, means for simultaneously operating the rams whereby the weight of one ram counterbalances the other ram, said means including a motor, crankshaft, rocker arms and connecting rods, means on the press for a controlled step-by-step feed of material therethrough, said means including a one-way clutch, means for accurately operating the feeding motion of the clutch, said last-named means including a driving disk at one end of the crankshaft, a screw-threaded shaft diametrically positioned in a wedge-shaped groove in the driving disk, link and lever connections leading from the clutch, a wedge-shaped element corresponding to the groove and mounted on the shaft, said wedge-shaped element including a bearing for one of the link connections to the clutch, and means for locking the wedge-shaped element in its groove.

2. A punch press, comprising a framework and a pair of rams slidably mounted in the framework movable toward and from each other, crank-shaft connections in the framework for operating the rams, rollers for feeding material through the punch press, means for operating the feed rollers in an intermittent step-by-step movement, material guiding pilot means in the machine, means for separating the feed rollers for freeing the material at predetermined times of practically instantaneous duration, thereby allowing the pilot means to act upon the material while the same is at rest and in an unconstrained position, said means including a cam on one end of the crank-shaft, a push-rod slidably mounted in the framework of the machine, one end of the push-rod associated with the cam, link and bell-crank lever connections between the other end of the push-rod and the feed rollers, and springs for normally maintaining the feed rollers in gripping relationship with the material passing therethrough.

3. A punch press, comprising a framework and a pair of rams slidably mounted in the framework movable toward and from each other, means associated with the rams whereby the weight of one ram counterbalances the other, a motor and crank-shaft connections in the framework for operating the rams, means for feeding material through the punch press, said means including sets of feed rollers, means for operating the feed rollers in an intermittent step-by-step movement, material guiding pilot means in the machine, and means for separating the feed rollers for freeing the material at predetermined times of practically instantaneous duration.

4. A punch press, comprising a framework and a pair of rams slidably mounted therein for movement toward and from each other, means for operating the rams whereby the weight of one ram counterbalances the other, said means including a motor and crank-shaft, means for feeding material through the press, said means including sets of feed rollers, a pair of one-way clutches for operating the feed rollers in an intermittent step-by-step movement, material guiding pilot means in the machine, means for separating the feed rollers for freeing the material at predetermined times of practically instantaneous duration, thereby allowing the pilot means to act upon the material, and also allowing of a working operation on the material while the same is at rest.

5. A punch press, comprising a framework and a pair of rams slidably mounted in the framework movable toward and from each other, operating means associated with the rams whereby a counter-balanced action results, a motor and crank-shaft connections in the framework for operating the rams, dies on the rams, means for feeding material through the punch press, said means including sets of feed rollers, a one-way clutch for operating the feed rollers in an intermittent step-by-step movement, material guiding pilot means in the dies, means for separating the feed rollers for freeing the material at predetermined times of practically instantaneous duration, thereby allowing the pilot means to act upon the material, and also allowing of a working operation on the material while the same is at rest and in an unconstrained position, together with means for accurately controlling the intermittent feeding movement of the clutch elements, said means including an associated automatically operating brake element.

6. A punch press, comprising a framework and a pair of rams slidably mounted in the framework movable toward and from each other, crankshaft connections in the framework for operating the rams, rollers for feeding material through the punch press, one-way clutches for operating the feed rollers in an intermittent step-by-step movement, material guiding pilot means in the machine, means for separating the feed rollers for freeing the material at predetermined times of practically instantaneous duration, thereby allowing the pilot means to act upon the material, and also allowing of a working operation on the material while the same is at rest and in an unconstrained position, said means including a cam on one end of the crank-shaft, a push-rod slidably mounted in the framework of the machine, one end of the push-rod associated with the cam, and link and bell-crank lever connections between the other end of the push-rod and the feed rollers.

7. A punch press, comprising a framework and a pair of rams slidably mounted in the framework movable toward and from each other, an operating crank-shaft means on the punch press for a step-by-step feed of material therethrough, said means comprising a pair of one-way clutch elements, means for accurately controlling the intermittent feeding movement of the clutch elements, said means including an associated automatically operating brake element, an adjustment on the operating means for the clutches, a driving disk at one end of the crank-shaft, and links and levers connecting the driving disk to the one-way clutch elements.

8. A punch press, comprising a framework and a pair of rams slidably mounted in the framework simultaneously movable toward and from each other, a crankshaft for operating the rams, and means on the punch press for a step-by-step feed of material therethrough, said means comprising a pair of one-way clutch elements, together with means for accurately controlling the intermittent feeding movement of the clutch elements, said means including an inertia controlling brake element, and adjustable operating means for the clutches, said operating means including a driving disk at one end of the crankshaft, an adjustable crank pin on the disk, and links and levers connecting the driving disk to the one-way clutch elements.

9. A punch press, comprising a framework and a pair of rams slidably mounted in the framework movable toward and from each other, a motor and crankshaft for operating the rams, and means on the punch press for a step-by-step feed of material therethrough, said means comprising a pair of one-way clutches, together with means for accurately controlling the intermittent feeding movement of the clutches, said means including a brake, and also including an adjustment on the operating means for the clutches, said operating means comprising a driving disk at one end of the crank-shaft, and links and levers connecting the driving disk to the one-way clutch elements, a screw-threaded shaft positioned in a channel in the disk, a crank-pin mounted on the screw-threaded shaft, and means for locking the crank-pin in adjusted position on the disk.

10. A punch press, comprising a framework and a pair of rams slidably mounted in the framework movable toward and from each other, a motor and crank-shaft connections in the framework for operating the rams, rollers for feeding the material through the punch-press, means for operating the feed rollers in an intermittent step-by-step movement, material guiding pilot means in the machine, means for separating the feed rollers for freeing the material at predetermined times of practically instantaneous duration, thereby allowing the pilot means to act upon the material while the same is at rest and in an unconstrained position, said means including a cam on one end of the crank-shaft, a push-rod slidably mounted in the framework of the machine, one end of the push-rod associated with the cam, link and bell-crank lever connections between the other end of the push-rod and the feed rollers, and springs for normally maintaining the feed rollers in gripping relationship with the material passing therethrough, said bell-crank levers acting against the tension of said springs.

JOSEPH M. SCHMIED.